US010400984B2

(12) United States Patent
Raleigh et al.

(10) Patent No.: US 10,400,984 B2
(45) Date of Patent: Sep. 3, 2019

(54) LED LIGHT FIXTURE AND UNITARY OPTIC MEMBER THEREFOR

(71) Applicant: Cree, Inc., Durham, NC (US)

(72) Inventors: Craig Raleigh, Racine, WI (US); Kurt S. Wilcox, Libertyville, IL (US)

(73) Assignee: Cree, Inc., Durham, NC (US)

(*) Notice: Subject to any disclaimer, the term of this patent is extended or adjusted under 35 U.S.C. 154(b) by 337 days.

(21) Appl. No.: 13/843,928

(22) Filed: Mar. 15, 2013

(65) Prior Publication Data

US 2014/0268762 A1 Sep. 18, 2014

(51) Int. Cl.
*F21V 5/00* (2018.01)
*F21V 5/04* (2006.01)
(Continued)

(52) U.S. Cl.
CPC ............. *F21V 5/04* (2013.01); *B29C 45/16* (2013.01); *B29D 11/0074* (2013.01);
(Continued)

(58) Field of Classification Search
CPC . F21V 5/007; F21V 5/04; F21V 5/008; H01L 23/28; H01L 23/3157; H01L 33/54; B29C 45/16; B29D 11/0074; B29D 11/00807; B29D 11/00019; B29D 11/00355; Y10T 428/24612; Y10T 428/24942
(Continued)

(56) References Cited

U.S. PATENT DOCUMENTS 3,560,598 A * 2/1971 Neefe ............. B29D 11/00028
264/1.8
3,760,237 A * 9/1973 Jaffe ....................... H01L 33/54
257/790
(Continued)

FOREIGN PATENT DOCUMENTS

DE 202014100462 4/2014
EP 1657758 A2 5/2006
(Continued)

OTHER PUBLICATIONS

"Plastic Optics", William S. Beich, accessed from http://www.photonics.com/EDU/Handbook.aspx?AID=25487 on Nov. 3, 2015.*
(Continued)

*Primary Examiner* — Erin Kryukova
(74) *Attorney, Agent, or Firm* — Jansson Munger McKinley & Kirby Ltd.

(57) ABSTRACT

A unitary optic member for directing light from a plurality of LED light sources on a board beneath the optic member which has a plurality of lens portions surrounded by and interconnected by a non-lens portion. The optic member being formed by a plurality of layers with layer-to-layer interface bonding between adjacent layers and comprising an asymmetric light-receiving inner-surface defining a pair of cavities, a portion of the inner surface which defines one of the cavities is at least partially formed by an innermost layer of the plurality of layers, at least a portion of another of the plurality of layers extending inwardly between the pair of cavities and being bonded to the innermost layer.

37 Claims, 8 Drawing Sheets

(51) Int. Cl.
| | |
|---|---|
| *B29C 45/16* | (2006.01) |
| *B29D 11/00* | (2006.01) |
| *B29K 83/00* | (2006.01) |
| *B29L 11/00* | (2006.01) |
| *F21Y 105/10* | (2016.01) |
| *F21Y 115/10* | (2016.01) |

(52) U.S. Cl.
CPC ........ *F21V 5/007* (2013.01); *B29K 2083/005* (2013.01); *B29K 2995/0031* (2013.01); *B29L 2011/0016* (2013.01); *F21Y 2105/10* (2016.08); *F21Y 2115/10* (2016.08)

(58) Field of Classification Search
USPC ....... 362/331, 332, 335, 235, 236, 237, 244, 362/326; 359/642–830; 264/1.7
See application file for complete search history.

(56) References Cited

U.S. PATENT DOCUMENTS

| | | | |
|---|---|---|---|
| 4,808,101 A | 2/1989 | Schad et al. | |
| 5,223,275 A | 6/1993 | Gellert | |
| 5,485,317 A | 1/1996 | Perissinotto et al. | |
| 5,494,615 A | 2/1996 | Wang Lee | |
| 5,836,676 A | 11/1998 | Ando et al. | |
| 5,954,423 A | 9/1999 | Logan et al. | |
| 6,123,889 A | 9/2000 | Katagiri et al. | |
| 6,395,201 B1 | 5/2002 | Hunt | |
| 6,499,870 B1 | 12/2002 | Zwick et al. | |
| 6,502,956 B1 | 1/2003 | Wu | |
| 6,606,199 B2 * | 8/2003 | Wang | 359/652 |
| 6,636,363 B2 | 10/2003 | Kaminsky | |
| 6,679,621 B2 | 1/2004 | West | |
| 6,896,381 B2 | 5/2005 | Benitez et al. | |
| 6,942,360 B2 | 9/2005 | Chou | |
| 7,056,567 B2 | 6/2006 | O'Neill et al. | |
| 7,152,985 B2 | 12/2006 | Benitez | |
| 7,283,313 B2 | 10/2007 | Tamaoki et al. | |
| 7,284,871 B2 * | 10/2007 | Oon | G03B 15/05 257/E25.02 |
| 7,682,533 B2 | 3/2010 | Iatan | |
| 7,682,853 B2 | 3/2010 | Ashida | |
| 7,696,527 B2 | 4/2010 | Uemoto et al. | |
| 7,722,196 B2 | 5/2010 | Caire et al. | |
| 7,724,321 B2 | 5/2010 | Hsieh et al. | |
| 7,736,019 B2 | 6/2010 | Shimada | |
| 7,906,892 B2 * | 3/2011 | Choi | H01L 33/504 313/112 |
| 7,918,590 B1 | 4/2011 | Li | |
| 8,215,814 B2 | 7/2012 | Marcoux | |
| 8,235,547 B2 | 8/2012 | Hofmann | |
| 8,292,482 B2 | 10/2012 | Harbers | |
| 8,294,165 B2 * | 10/2012 | Hattori | H01L 33/505 257/100 |
| 8,330,176 B2 | 12/2012 | Thompson | |
| 8,348,461 B2 | 1/2013 | Wilcox | |
| 8,419,219 B2 * | 4/2013 | Yamamoto | H01L 33/54 362/231 |
| 8,434,912 B2 | 5/2013 | Holder et al. | |
| 8,459,848 B2 | 6/2013 | Marley | |
| 8,545,049 B2 | 10/2013 | Davis | |
| 8,602,605 B2 | 12/2013 | Park | |
| 8,690,382 B2 * | 4/2014 | Farmer | F21V 5/00 362/223 |
| 8,771,577 B2 * | 7/2014 | Basin | H01L 33/50 264/261 |
| 8,814,392 B1 * | 8/2014 | Lipowsky | G02B 1/105 359/599 |
| 8,820,963 B2 | 9/2014 | Quilici | |
| 8,891,171 B2 | 11/2014 | Choquet et al. | |
| 8,899,786 B1 * | 12/2014 | Moghal | F21V 31/005 362/244 |
| 9,915,410 B2 * | 3/2018 | York | F21V 13/04 |
| 2002/0034081 A1 | 3/2002 | Serizawa | |
| 2003/0169504 A1 | 9/2003 | Kaminsky et al. | |
| 2003/0235050 A1 | 12/2003 | West et al. | |
| 2004/0161490 A1 | 8/2004 | Babin et al. | |
| 2004/0246606 A1 | 12/2004 | Benitez et al. | |
| 2005/0073840 A1 | 4/2005 | Chou et al. | |
| 2005/0093430 A1 * | 5/2005 | Ibbetson | H01L 33/505 313/501 |
| 2005/0168987 A1 * | 8/2005 | Tamaoki | B43K 29/10 362/244 |
| 2005/0184638 A1 * | 8/2005 | Mueller | C09K 11/0883 313/485 |
| 2005/0231812 A1 | 10/2005 | Leu et al. | |
| 2006/0033431 A1 | 2/2006 | Hsieh | |
| 2006/0105485 A1 * | 5/2006 | Basin | H01L 24/97 438/27 |
| 2006/0252169 A1 | 11/2006 | Ashida | |
| 2007/0030675 A1 * | 2/2007 | Oon | G03B 15/05 362/237 |
| 2007/0201225 A1 | 8/2007 | Holder et al. | |
| 2008/0079182 A1 | 4/2008 | Thompson et al. | |
| 2008/0084693 A1 | 4/2008 | Shimada et al. | |
| 2008/0151550 A1 | 6/2008 | Liu et al. | |
| 2008/0169523 A1 * | 7/2008 | Vigier-Blanc | G02B 3/0087 257/432 |
| 2008/0198604 A1 | 8/2008 | Kim | |
| 2008/0203415 A1 | 8/2008 | Thompson et al. | |
| 2008/0273325 A1 | 11/2008 | Wilcox et al. | |
| 2008/0273326 A1 | 11/2008 | Wilcox et al. | |
| 2008/0285136 A1 | 11/2008 | Jacobowitz | |
| 2008/0298056 A1 | 12/2008 | Petersen | |
| 2009/0008662 A1 * | 1/2009 | Ashdown | H01L 25/0753 257/98 |
| 2009/0039376 A1 * | 2/2009 | Uemoto et al. | 257/99 |
| 2009/0109542 A1 * | 4/2009 | Li | G02B 3/0056 359/626 |
| 2009/0159915 A1 * | 6/2009 | Branchevsky | 257/98 |
| 2009/0298376 A1 | 12/2009 | Guillien et al. | |
| 2010/0002449 A1 | 1/2010 | Lin | |
| 2010/0014290 A1 * | 1/2010 | Wilcox | F21V 5/04 362/244 |
| 2010/0163909 A1 | 7/2010 | Chen et al. | |
| 2010/0172135 A1 * | 7/2010 | Holder | F21K 9/00 362/249.14 |
| 2010/0207140 A1 | 8/2010 | Rudaz et al. | |
| 2010/0230693 A1 * | 9/2010 | Tran | H01L 33/483 257/98 |
| 2010/0264432 A1 * | 10/2010 | Liu | H01L 25/0753 257/89 |
| 2010/0271708 A1 | 10/2010 | Wilcox | |
| 2010/0271829 A1 | 10/2010 | Laporte | |
| 2010/0308356 A1 * | 12/2010 | Wirth | H01L 33/54 257/98 |
| 2011/0026247 A1 | 2/2011 | Zhang et al. | |
| 2011/0031516 A1 * | 2/2011 | Basin | H01L 33/507 257/98 |
| 2011/0063857 A1 | 3/2011 | Li et al. | |
| 2011/0069496 A1 | 3/2011 | Ing et al. | |
| 2011/0103051 A1 | 5/2011 | Wilcox et al. | |
| 2011/0110098 A1 | 5/2011 | Fu et al. | |
| 2011/0157891 A1 | 6/2011 | Davis et al. | |
| 2011/0164425 A1 | 7/2011 | Chen et al. | |
| 2011/0176301 A1 | 7/2011 | Liang et al. | |
| 2011/0242807 A1 | 10/2011 | Little, Jr. et al. | |
| 2011/0267822 A1 | 11/2011 | Harbers et al. | |
| 2011/0280014 A1 | 11/2011 | Householder et al. | |
| 2011/0291548 A1 * | 12/2011 | Nguyen The | F21V 9/16 313/501 |
| 2011/0292658 A1 | 12/2011 | Ho | |
| 2011/0304269 A1 | 12/2011 | Wang | |
| 2012/0003343 A1 | 1/2012 | Armstrong et al. | |
| 2012/0014115 A1 * | 1/2012 | Park | G02B 27/0955 362/311.02 |
| 2012/0091487 A1 | 4/2012 | Chan et al. | |
| 2012/0126268 A1 | 5/2012 | Seo et al. | |
| 2012/0132597 A1 | 5/2012 | Byalskiy et al. | |
| 2012/0170280 A1 | 7/2012 | Choquet | |
| 2012/0201031 A1 | 8/2012 | Marley | |

(56) References Cited

U.S. PATENT DOCUMENTS

| | | |
|---|---|---|
| 2012/0281404 A1 | 11/2012 | Wilcox et al. |
| 2012/0294011 A1 | 11/2012 | Cattoni |
| 2012/0307495 A1* | 12/2012 | Shih .............................. 362/237 |
| 2012/0307503 A1 | 12/2012 | Wilcox et al. |
| 2012/0319592 A1 | 12/2012 | Riesebosch |
| 2012/0319616 A1 | 12/2012 | Quilici et al. |
| 2013/0148363 A1* | 6/2013 | Choquet et al. ......... 362/311.02 |
| 2013/0194799 A1 | 8/2013 | Wu et al. |
| 2014/0029114 A1 | 1/2014 | Kim |
| 2014/0126206 A1 | 5/2014 | Wilcox et al. |
| 2014/0160724 A1* | 6/2014 | Lerman ..................... F21V 5/04 362/84 |
| 2014/0268810 A1* | 9/2014 | Marquardt et al. ........... 362/308 |

FOREIGN PATENT DOCUMENTS

| | | |
|---|---|---|
| EP | 2495096 A2 | 9/2012 |
| JP | H0319818 | 1/1991 |
| JP | H03138147 | 6/1991 |
| JP | H03142207 | 6/1991 |
| JP | 2001191365 A | 7/2001 |
| WO | 2008076399 A2 | 6/2008 |
| WO | WO2010095068 A2 | 8/2010 |
| WO | WO2011091529 A1 | 8/2011 |
| WO | 2012147342 A1 | 11/2012 |

OTHER PUBLICATIONS

"Focus on Precision—Injection Molding Optical Components" by Michael Stricker, et al.; Translated from Kunststoffe Apr. 2009, pp. 30-34.

English Language Abstract of JP H03142207, Hiroshi et al., Jun. 19, 1991.

English Language Abstract of JP H0319818, Tatsu, Jan. 29, 1991.

English Language Abstract of DE 202014100462, Grunecker et al., Apr. 10, 2014.

English Language Abstract of JP H03138147, Akihiro et al., Jun. 12, 1991.

* cited by examiner

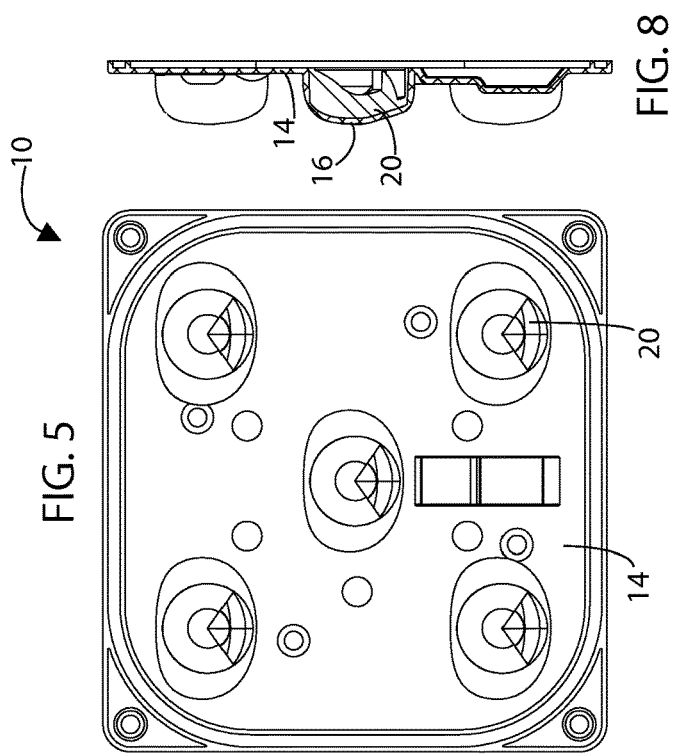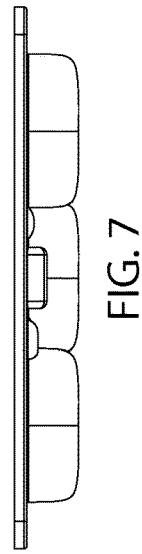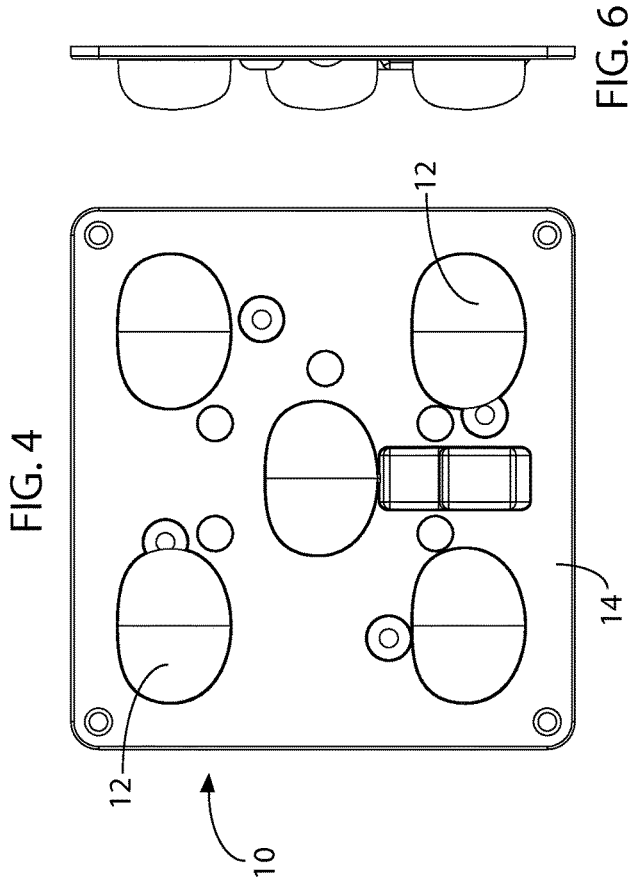

LED LIGHT FIXTURE AND UNITARY OPTIC MEMBER THEREFOR

FIELD OF THE INVENTION

The invention relates generally to the field of LED (light emitting diode) light fixtures and, more particularly, to secondary lenses for directing light from LED light sources, and, still more particularly, to polymeric lenses for LED light fixtures.

BACKGROUND OF THE INVENTION

There is a need for lighting apparatus for a variety of general lighting purposes which is low-cost and energy-efficient. LED light sources are energy-efficient, and advances in LED technology are providing even greater efficiencies over time. One important aspect of LED light fixtures is the so-called secondary lensing that directs light received from LED light sources. As used herein, the term "LED light source" refers to an LED or a small grouping of LEDs alone, or more typically to what is referred to as an LED package—namely, an LED (or small grouping of LEDs) with what is referred to as a primary lens formed thereon. Secondary lenses, which receive and direct light from LED light sources, are of significant importance to LED light fixtures in many ways.

Secondary lenses play a major role, of course, in the direction of light from a light fixture, and so determine the degree and spread of illumination, and overall optical efficiency. The forming and shaping of secondary lenses are typically important considerations with respect to the usefulness of an LED fixture, and play a significant role in overall product cost. Improvements in secondary lenses, their optical capabilities, and their manufacture are important considerations in the field of LED light fixtures.

LED light fixtures for a wide variety of both specific and general lighting applications typically have a plurality of LED light sources, usually positioned in spaced relationship to one another on a board (e.g., a circuit board), and a secondary lens is aligned with each LED light source. Such secondary lenses are in some cases part of a unitary member that has a plurality of secondary lens portions each surrounded by and interconnected by a non-lens portion. Improvements in such multi-secondary-lens members, the optical capabilities of the secondary lens portions, and the manufacture of such members are important considerations in the field of LED light fixtures. More specifically, speed (and therefore cost) and accuracy of manufacture are particularly important considerations.

It would be highly beneficial to provide an improved unitary optical member and LED secondary lensing which are low-cost, highly accurate and useful in directing LED light, and which contribute to the overall economy and efficiency of LED light fixtures.

SUMMARY OF THE INVENTION

The present invention is an improved secondary lens and improved unitary optic member for LED light fixtures and a method of manufacture. These address the above-noted needs, concerns and considerations and serve to improve product quality and efficiency and reduce manufacturing costs of high-performance LED light fixtures.

One aspect of the invention is a unitary optic member for directing light from a plurality of LED light sources in spaced relationship to one another on a board beneath the optic member, the optic member having a plurality of lens portions each for directing light from one of the plurality of LED light sources, the lens portions being surrounded by and interconnected by a non-lens portion. The optic member comprises: a first molded polymeric layer forming the non-lens portion and the outermost layer of each of the lens portions, the outermost layer of each lens portion forming a pocket-space at such lens portion; and for each lens portion, a second molded polymeric layer overmolded onto the first polymeric layer within the corresponding pocket-space.

In certain embodiments, the first and second polymeric layers of the unitary optic member are of different polymeric materials. In some such embodiments, the first layer is an acrylic layer and the second layer is a cured liquid silicone resin (LSR) layer, and in such of these embodiments the second layer is the innermost layer. Use of an LSR later as the innermost layer tends to allows excellent precision in the intended light-directing functions of the lens portions of the unitary optic member, even while providing time- and cost-related manufacturing advantages.

In certain embodiments, the first molded polymeric layer is injection-molded, and in some other embodiments it is thermoformed.

In some embodiments, the unitary optic member also includes a third molded polymeric layer overmolded onto the second polymeric layer within the corresponding pocket-space, such third molded polymeric layer being the innermost layer. In some of such embodiments, the third layer is an LSR layer.

In certain embodiments, the contacting layers are of polymeric materials having different indices of refraction. Such refraction-index differences provide additional light-directing advantages for the lens portions of the unitary optic member.

Another aspect of this invention is a unitary multi-lens-portion optic member of the type described which includes: a molded polymeric layer that forms the outermost layer of each of the lens portions and also forms non-lens portion between the lens portions; and for each lens portion another molded polymeric layer, the polymeric layers being overmolded to one another. As already noted, in certain embodiments the first molded polymeric layer is injection-molded and in some other embodiments it is thermoformed. Any plastic forming method to produce such molded (i.e., formed) layer may be acceptable.

Still another aspect of this invention is a method for manufacturing a unitary optic member having plural lens portions surrounded by and interconnected by a non-lens portion. The method includes the steps of: forming a first molded polymeric layer including the non-lens portion and an outermost layer of each of the lens portions, such forming step including forming a pocket-space at each lens portion; and, for each lens portion, injection-molding a second molded polymeric layer onto the first polymeric layer within the corresponding pocket-space.

In certain embodiments, the first molded polymeric layer is formed by injection-molding, and in some other embodiments it is formed by thermoforming using a thermoforming press.

In some embodiments of the method of this invention, each of the lens portions further includes overmolding a third molded polymeric layer onto the second polymeric layer within the corresponding pocket-space, the third molded polymeric layer becoming the innermost layer.

Yet another aspect of this invention is a multi-layer polymeric lens for directing light from an LED light source, the lens having at least an innermost layer and an outermost layer and defining a lens optical footprint, wherein the innermost layer is less than coextensive with the lens optical footprint. As used herein, the term "lens optical footprint" means the largest light-passage area within the lens and orthogonal to the axis of the light source. The adjacent layers are joined together permanently at their interface such as by overmolding.

The multi-layer aspect of this invention reduces overall processing time in lens manufacture because multiple thin layers (thinner than the entire lens) cool faster than is the case for a one-layer lens of the same shape. Furthermore, such layering and related cycle time advantages reduce lens distortion, a factor of particular importance for lenses with complex shapes—such as inner-surface shapes. This invention is based in part on the recognition that use of a layer which is less than coextensive with the lens optical footprint facilitates manufacture of complex LED secondary lenses.

The outermost layer may include a flange extending beyond the lens optical footprint. In certain embodiments, the innermost and outermost layers of the multi-layer polymeric lens are of an acrylic. In some embodiments, the two layers have different indices of refraction.

In some embodiments of the invention, the multi-layer polymeric lens of this invention includes an intermediate layer between the innermost and outermost layers. Adjacent layers of the multi-layer polymeric lens are joined together permanently at their interface such as by overmolding. The innermost, intermediate, and outermost layers may be an acrylic. The layers may be of particular polymeric materials having different indices of refraction, for the light-directing reasons noted above.

A related aspect of this invention is an improved LED light fixture of the type including (a) a heat-sink structure having a mounting surface, (b) a circuit board on the mounting surface and having a plurality of LED light sources spaced thereon, and (c) an optic member over the circuit board and having a plurality of secondary lenses thereon each in alignment with a corresponding one of the light sources. In the improvement, the optic member is a unitary optic member which comprises: a first molded polymeric layer forming (a) the non-lens portion and (b) an outermost layer of each of the lens portions, the outermost layer of each lens portion forming a pocket-space at such lens portion; and for each lens portion, a second molded polymeric layer overmolded onto the first polymeric layer within the corresponding pocket-space.

Still another aspect of this invention is a multi-layer polymeric lens for directing light from an LED light source, the lens defining a lens optical footprint, and at least one of the layers being less than coextensive with the lens optical footprint. In some embodiments, another of the layers includes a flange extending beyond the lens optical footprint.

As used herein in describing the optic member, the term "unitary" means that the optic member is a single piece with its polymeric layers being formed at different times, a successive layer (or layers) being overmolded onto a previous layer (or layers) such that each layer-to-layer interface is bonded in the overmolding process.

As used herein, the term "outermost layer" refers to the layer farthest from the LED light source, or at least the last layer through which light from such light source passes. And the term "innermost layer" refers to the layer closest to the LED light source, or at least the first layer through which light from such light source passes.

In descriptions of this invention, including in the claims below, the terms "comprising," "including" and "having" (each in their various forms) and the term "with" are each to be understood as being open-ended, rather than limiting, terms.

BRIEF DESCRIPTION OF THE DRAWINGS

FIG. 4 is a top plan view of such unitary optic member.

FIG. 5 is a bottom plan view.

FIGS. 6 and 7 are side elevations taken from two adjacent sides of the unitary optic member.

FIG. 8 is a side sectional view taken along section 8-8 as indicated in FIG. 4.

DETAILED DESCRIPTION OF EXEMPLARY EMBODIMENTS

Figure 1:
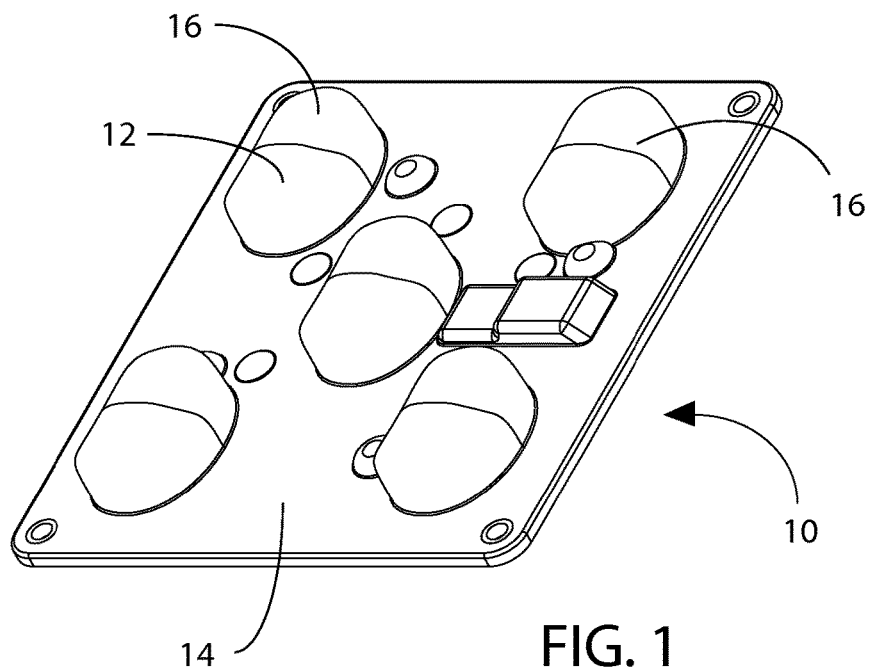
FIG. 1 is a perspective view of a unitary optic member in accordance with this invention, showing its light-output side.
Figure 2:
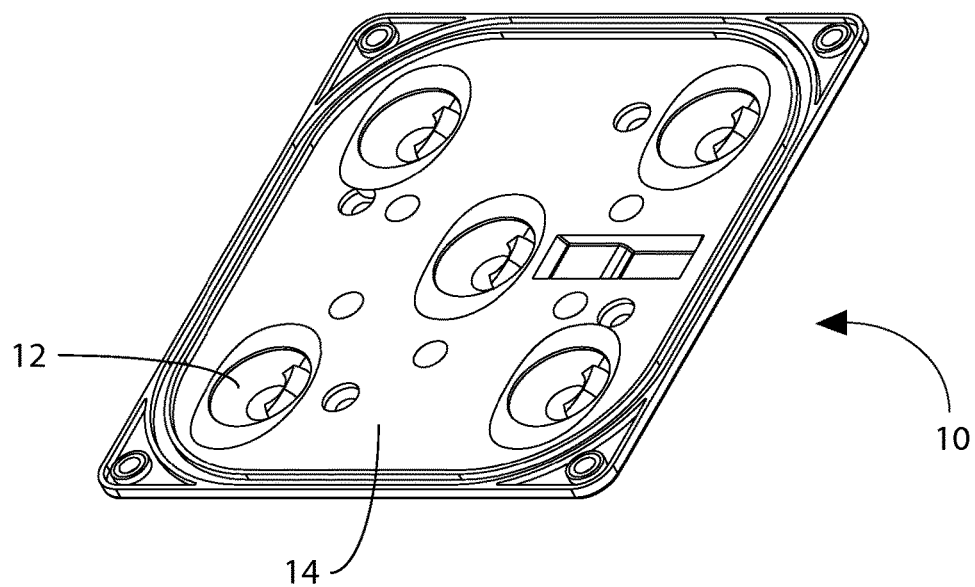
FIG. 2 is a perspective view of such unitary optic member, but showing its light-input side.

Referring in more detail to the drawings of the exemplary embodiments, FIGS. 1-9 illustrate a unitary optic member 10 in accordance with this invention. Unitary optic member 10 has five lens portions 12 which are surrounded by and interconnected by a non-lens portion 14.

Unitary optic member 10 includes a first molded polymeric layer which forms non-lens portion 14 and the outermost layer 16 of each lens portion 12. Outermost layer 16 of each lens portion 12 forms a pocket-space 18 at such lens portion. For each portion 12, a second molded polymeric layer 20 is overmolded onto the first polymeric layer within corresponding pocket-space 18.

While the first and second polymeric layers of unitary optic member 10 can be of the same polymeric material, in this embodiment the first and second polymeric layers are of different polymeric materials. More specifically, non-lens portion 14 and outermost layer 16 (of each lens portion 12) is an acrylic, and second polymeric layer 20 is an LSR. A wide variety of optical-grade acrylics can be used, and are available from various sources, including: Mitsubishe Rayon America, Inc.; Arkema Group; and Evonik Cyro LLC. Likewise, a wide variety of optical-grade LSRs can be used, and are available from various sources, such as: The Dow Chemical Company; Wacker Chemie AG; and Momentive Performance Materials Products. Some optical-grade acrylics useful in this invention have an index of refraction 1.49, and some optical-grade LSR materials have an index of refraction of 1.41.

Figure 9:
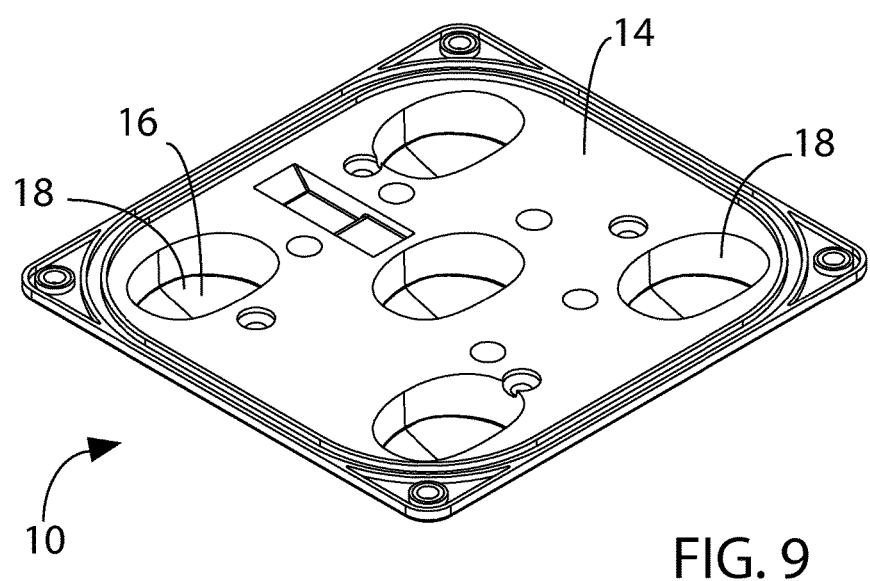
FIG. 9 is a perspective view of the first molded polymeric layer prior to, for each lens portion, the overmolding of the second molded polymeric layer.

The first molded polymeric layer, including its non-lens portion 14 and the outermost layer of each of lens portions 14, is injection-molded, although as noted above other processes to preform such first molded polymeric layer, such as thermoforming, can be used. FIG. 9 illustrates the first molded polymeric member and five pocket spaces 18 which it forms prior to overmolding of second polymeric layer 20 within each of pocket spaces 18. For such overmolding, the first molded polymeric layer is placed in a mold and, for each pocket space 18, lens portions 12 are made by injection molding the second polymeric layer into spaces 18.

Figure 3:
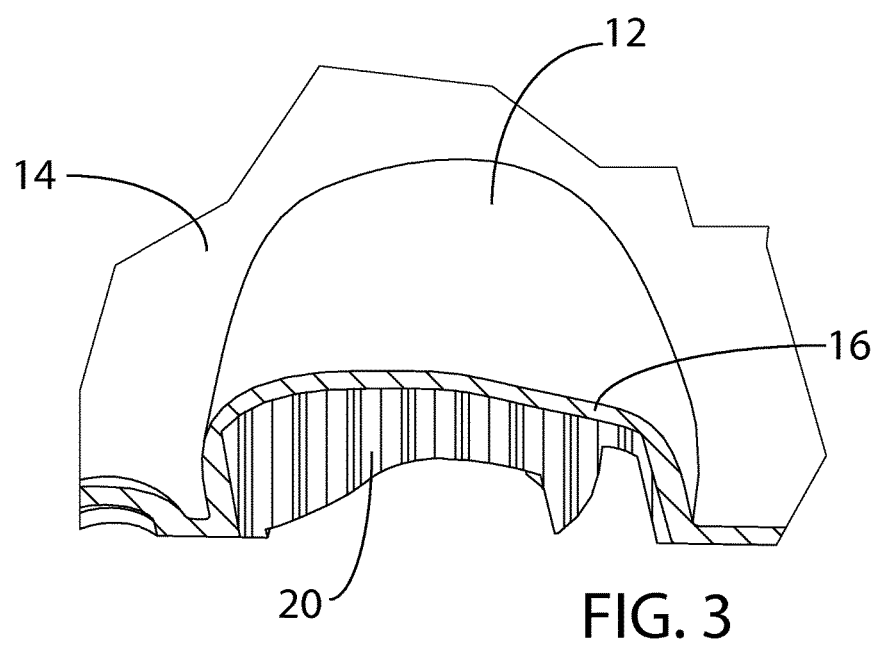
FIG. 3 is an enlarged fragmentary sectional perspective view, showing for one lens the first molded polymeric layer and the second molded polymeric layer overmolded onto the first layer within a pocket-space formed in the first molded layer.

FIG. 3 clearly illustrates outermost layer 16 and second polymeric layer 20 of one of lens portions 12. Such lens portions are two-layered lenses.

Figure 10:
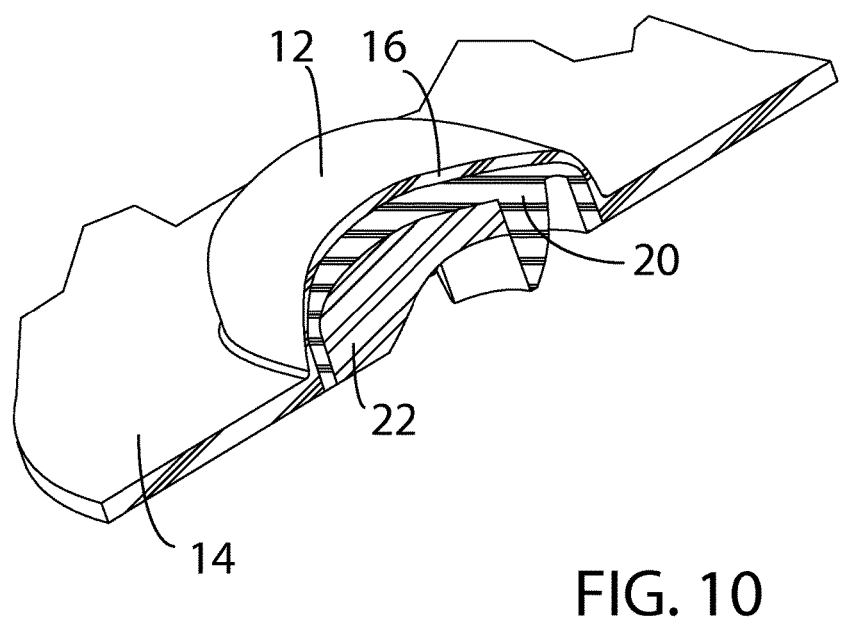
FIG. 10 is an enlarged fragmentary sectional perspective view, as in FIG. 3, but illustrating an embodiment having a third molded polymeric layer as the innermost layer.
Figure 11:
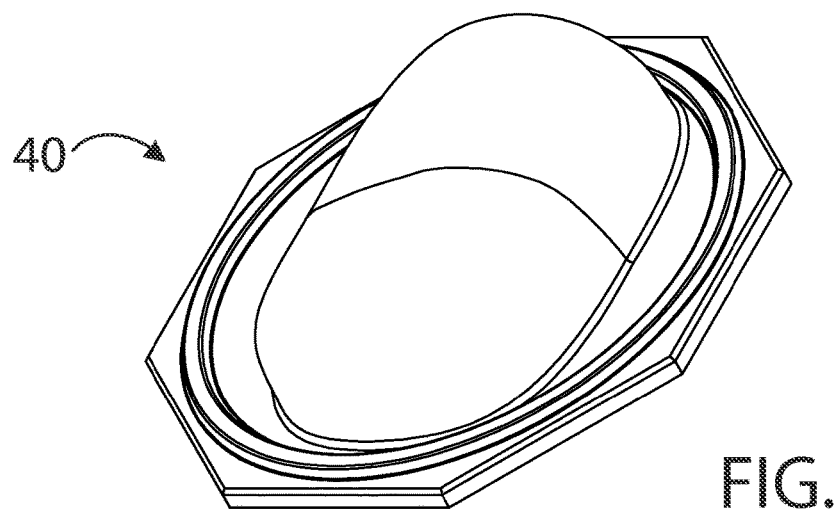
FIG. 11 is a perspective view of the three-layer polymeric lens of FIG. 10, showing its light-output side.
Figure 12:
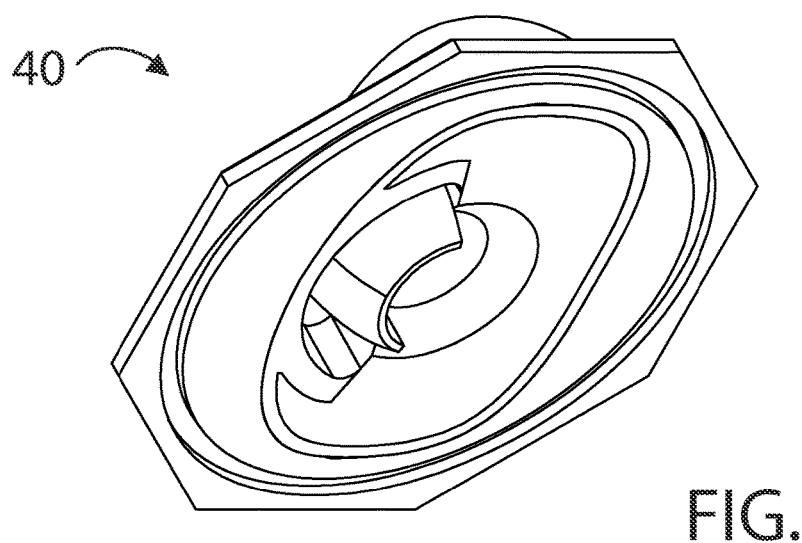
FIG. 12 is a perspective view of the lens of FIG. 11, but showing its light-input side.
Figure 13:
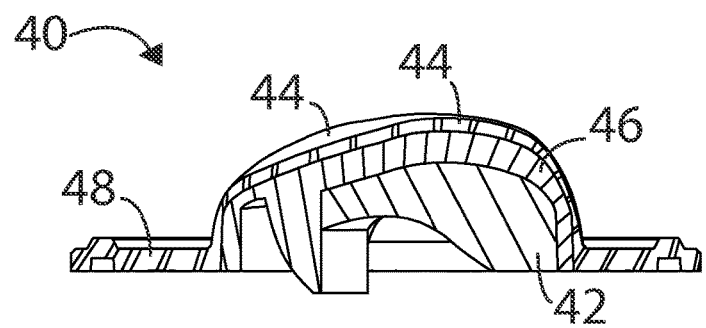
FIG. 13 is a central cross-sectional view of the lens of FIG. 11, illustrating the three layers of the lens.
Figure 14:
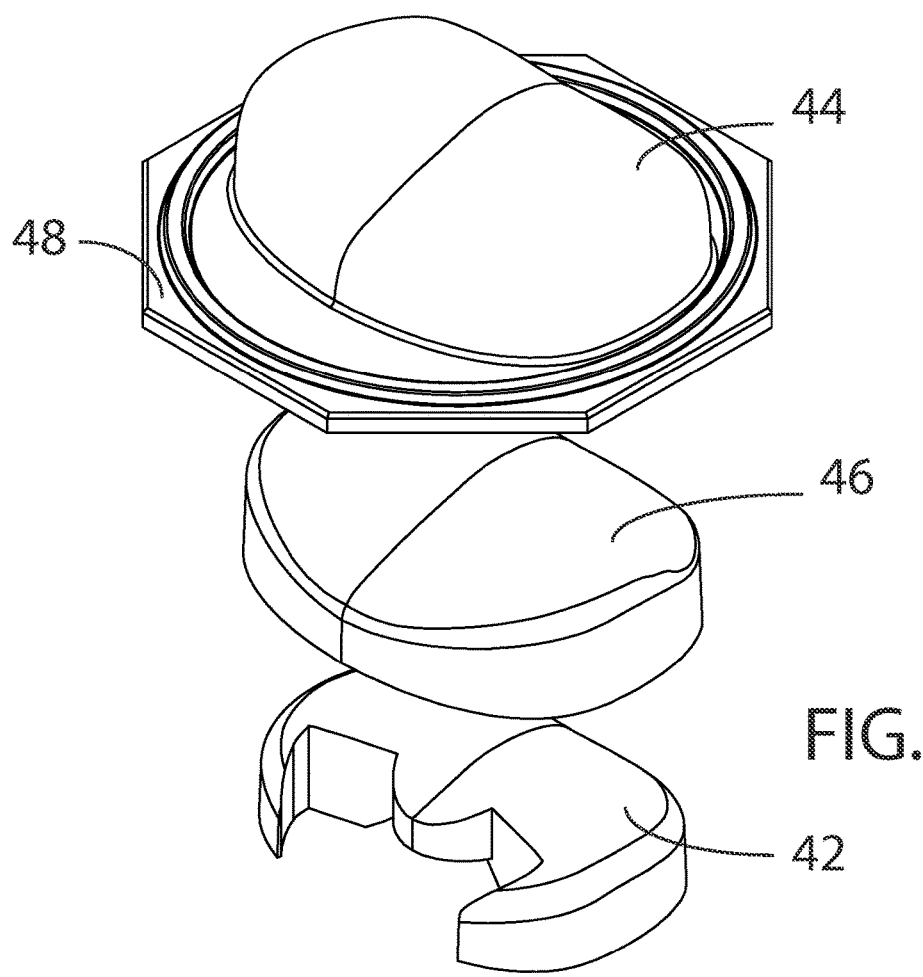
FIG. 14 is an exploded perspective view of such three-layer lens, serving to illustrate the shapes of the layers.

An alternative embodiment in which the lens portions are three-layered lenses is illustrated in FIG. 10, which is a view similar to that of FIG. 3. As can be seen in FIG. 10, the unitary optic member includes a third molded polymeric layer 22 which is overmolded onto second polymeric layer 20, also within corresponding pocket-space 18. Third molded polymeric layer, which is made by a subsequent injection-molding step immediately after the injection molding of second polymeric layer 20, is the innermost layer of the lens portion. Third molded polymeric layer 22 may be of the same polymeric materials as the other two layers, or the layers may have differing polymeric materials, including materials with differing indices of refraction. Third molded polymeric layer 22 may be an LSR layer.

Figure 15:
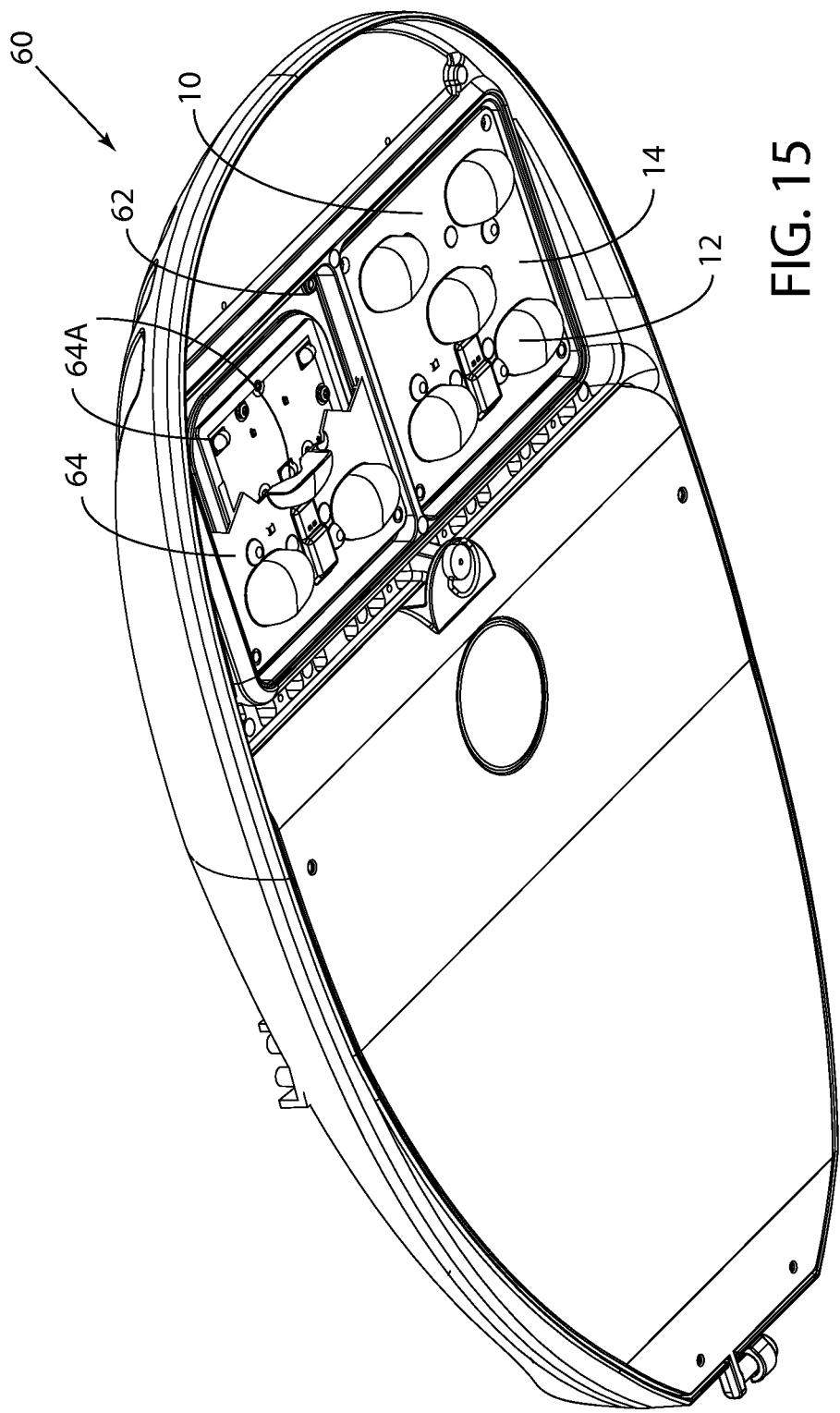
FIG. 15 is a partially broken-away perspective view of an LED light fixture in accordance with this invention.

FIG. 15 illustrates an improved LED light fixture 60 which utilizes two unitary optic members 10 of the type described above. FIG. 15 shows a circuit board 64 which is mounted on a heat sink 62, specifically on a surface thereof for circuit-board mounting. The circuit board has a plurality of LED light sources 64A spaced thereon, and each unitary optic member 10 has lenses 60 each in alignment with a corresponding one of light sources 64A. Unitary optic members 10 are as described in detail above.

FIGS. 11-14 illustrate another aspect of this invention. Such figures show a multi-layer polymeric lens 40 for directing light from an LED light source. Lens 40 of this embodiment has three layers, including an innermost layer 42, an outermost layer 44, and an intermediate layer 46. This is seen best in FIG. 13, and the layer shapes are illustrated in the FIG. 14 exploded view. As seen well in FIGS. 13 and 14, in lens 40 the optical footprint of the area receiving light from the LED light source by the outer surface of the innermost layer 42 is less than coextensive with the optical footprint of the area receiving light from the LED light source by the inner surface of the intermediate layer 46. The term "an optical footprint" means a projection on a two-dimensional surface orthogonal to the axis of the LED light source.

Outermost layer 44 of lens 40 includes a flange 48 extending beyond the optical footprint of lens 40.

The layers of each pair of adjacent layers of lens 40 are joined together permanently at their interface by overmolding. Lens 40 may be formed by a series of injection-molding steps. For example, innermost layer 42 is first formed by injection molding. Then, at the next injection-molding station, intermediate layer 46 is overmolded with innermost layer 42. And then, at a third injection-molding station, outermost layer 44 is overmolded onto the previously overmolded layers.

The layers of lens 40, as with respect to the layers illustrated best in FIGS. 3 and 10, may be of the same or differing polymeric materials. And injection-moldable materials may be chosen having different indices of refraction.

While the principles of this invention have been described in connection with specific embodiments, it should be understood clearly that these descriptions are made only by way of example and are not intended to limit the scope of the invention.

The invention claimed is:

1. A unitary optic member for directing light from a plurality of LED light sources in spaced relationship to one another on a board beneath the optic member, the optic member having a plurality of lenses each for directing light from one of the plurality of LED light sources, the optic member comprising:
   a first molded polymeric layer forming (a) a non-lens portion of the optic member, the non-lens portion surrounding each of the plurality of lenses and interconnecting them, and (b) an outermost layer of each of the lenses integral with and continuing from the surrounding non-lens portion; and
   each of the lenses having an asymmetric light-receiving inner-surface defining a pair of cavities with at least a portion of a second molded polymeric layer extending inwardly between the cavities and being in layer-to-layer interface bonding with the outermost layer of each of the lenses, a portion of the asymmetric light-receiving inner-surface which defines one of the cavities is at least partially formed by a third polymeric layer in layer-to-layer interface bonding with the second polymeric layer.

2. The unitary optic member of claim 1 wherein the first and second layers are of different polymeric materials.

3. The unitary optic member of claim 2 wherein the first layer is an acrylic layer and the third layer is an LSR layer.

4. The unitary optic member of claim 1 wherein the third layer is an innermost layer.

5. The unitary optic member of claim 1 wherein the first polymeric layer forms a pocket-space at each lens, the second and third molded polymeric layers being within the corresponding pocket-space.

6. The unitary optic member of claim 5 wherein at least two of the layers have different indices of refraction.

7. The unitary optic member of claim 1 wherein the third layer is an LSR layer.

8. The unitary optic member of claim 1 wherein at least two of the layers have different indices of refraction.

9. The unitary optic member of claim 8 wherein the third layer is an LSR layer.

10. An LED light fixture comprising:
    a heat-sink structure having a mounting surface;
    a circuit board on the mounting surface, the circuit board having a plurality of LED light sources spaced thereon; and
    a unitary optic member over the circuit board, the unitary optic member comprising a first polymeric layer forming a non-lens portion of the optic member interconnecting a plurality of lenses each of which is integral with and continuing from the surrounding non-lens portion, each of the plurality of lenses having an asymmetric light-receiving inner-surface defining a pair of cavities with at least a portion of a second polymeric layer extending inwardly between the cavities and being overmolded onto the first layer, a portion of the asymmetric light-receiving inner-surface which defines one of the cavities is at least partially formed by a third layer with layer-to-layer interface bonding with the second polymeric layer.

11. The LED light fixture of claim 10 wherein the first and second layers are of different polymeric materials.

12. The LED light fixture of claim 11 wherein the first layer is an acrylic layer and the third layer is an LSR layer.

13. The LED light fixture of claim 12 wherein the third layer is an innermost layer.

14. The LED light fixture of claim 10 wherein the first layer forms a pocket-space at each lens, the second and third molded polymeric layers being within the corresponding pocket-space.

15. The LED light fixture of claim 10 wherein at least two of the layers have different indices of refraction.

16. A lens for directing light from an LED light source, the lens being formed by a plurality of layers with layer-to-layer interface bonding between adjacent layers and comprising an asymmetric light-receiving inner-surface defining a pair of cavities, a portion of the inner-surface which defines one of the cavities is at least partially formed by an innermost layer of the plurality of layers, at least a portion of another of the plurality of layers extending inwardly between the pair of cavities and being bonded to the innermost layer.

17. The lens of claim 16 wherein the innermost layer is an LSR layer.

18. The lens of claim 16 wherein at least two of the layers have different indices of refraction.

19. The lens of claim 18 wherein one of the at least two layers is an LSR layer.

20. A unitary polymeric optic member for directing light received from a plurality of spaced apart LED light sources, the unitary optic member comprising a plurality of lenses each formed by a plurality of polymeric layers with layer-to-layer interface bonding between adjacent layers, each of the plurality of lenses having an asymmetric inner-surface defining a pair of cavities, a portion of the inner-surface which defines one of the cavities is at least partially formed by an innermost layer of the plurality of layers, at least a portion of another of the plurality of layers extending inwardly between the cavities and being bonded to the innermost layer.

21. The unitary polymeric optic member of claim 20 wherein the plurality of LED light sources are in spaced relationship to one another on a board beneath the optic member, the plurality of the lenses each being for directing light from one of the plurality of LED light sources.

22. The unitary polymeric optic member of claim 20 wherein the innermost layer is an LSR layer.

23. The unitary polymeric optic member of claim 20 wherein each of the lenses comprises an outermost layer of an acrylic.

24. The unitary polymeric optic member of claim 23 comprising an intermediate layer between the innermost and outermost layers.

25. The unitary polymeric optic member of claim 24 wherein the innermost, intermediate, and outermost layers are of an acrylic.

26. The unitary polymeric optic member of claim 20 wherein at least one pair of the bonded adjacent layers has different indices of refraction.

27. The unitary polymeric optic member of claim 20 wherein the asymmetric inner-surface is formed by the innermost layer and an intermediate polymeric layer.

28. The unitary polymeric optic member of claim 20 wherein the unitary optic member comprises an outer polymeric layer forming an outermost layer of each of the lenses and a non-lens portion therebetween.

29. The unitary polymeric optic member of claim 28 wherein at least two of the layers have different indices of refraction.

30. A unitary optic member for directing light from a plurality of LED light sources in spaced relationship to one another on a board beneath the optic member, the optic member comprising a plurality of lenses each for directing light from one of the plurality of LED light sources and each formed by a plurality of polymeric layers,
    each of the plurality of lenses having an asymmetric light-receiving inner-surface defining a pair of cavities, a portion of the asymmetric inner-surface which defines one of the cavities being at least partially formed by an inner polymeric layer in layer-to-layer interface bonding with at least a portion of another polymeric layer which extends inwardly between the cavities.

31. The unitary optic member of claim 30 wherein the optic member further comprises an outer layer which is a molded polymeric layer forming a non-lens portion and an outermost layer of each of the plurality of lenses.

32. The unitary optic member of claim 31 wherein the outer layer is of different polymeric material than at least one other layer of the lenses.

33. The unitary optic member of claim 31 wherein the outer molded polymeric layer forms a pocket-space at each lens, the polymeric layers forming each of the lenses being within the corresponding pocket-space.

34. The unitary optic member of claim 31 wherein at least two of the layers have different indices of refraction.

35. The unitary optic member of claim 30 wherein the inner layer is an LSR layer.

36. The unitary optic member of claim 30 wherein at least two of the layers have different indices of refraction.

37. The unitary optic member of claim 30 wherein the inner layer and at least one other of the layers forming the corresponding lens have different indices of refraction.

* * * * *